United States Patent [19]

Carter et al.

[11] Patent Number: 5,136,894

[45] Date of Patent: Aug. 11, 1992

[54] TILTABLE MARINE STEERING HELM

[75] Inventors: Thomas G. Carter, Kent; Roger F. Olsen, Stow, both of Ohio

[73] Assignee: IMO Industries, Inc., Hudson, Ohio

[21] Appl. No.: 576,062

[22] Filed: Aug. 31, 1990

[51] Int. Cl.$^5$ .......................... B62D 1/18; G05G 5/06
[52] U.S. Cl. ....................................... 74/493; 74/540; 114/144 R
[58] Field of Search ............. 74/493, 540; 114/144 R; 464/151, 152, 155, 156; 180/258, 259; 280/775

[56] References Cited

U.S. PATENT DOCUMENTS

| | | | |
|---|---|---|---|
| 1,510,432 | 9/1924 | Wohlrab | 74/493 |
| 2,254,972 | 9/1941 | Mollart et al. | 464/151 |
| 2,629,356 | 2/1953 | Whiting | 114/144 |
| 2,641,115 | 6/1953 | Garrison | 464/151 |
| 2,826,090 | 3/1958 | Grinnell et al. | 74/493 |
| 2,926,545 | 3/1960 | Loeffler | 74/493 |
| 2,954,685 | 10/1960 | Cuq | 461/151 |
| 3,206,998 | 9/1965 | Matz, Jr. et al. | 74/494 |
| 3,208,300 | 9/1965 | Morse | 74/498 |
| 3,521,501 | 7/1970 | Kiekhaefer | 74/493 X |
| 3,799,569 | 3/1974 | Baker | 280/775 |
| 4,078,448 | 3/1978 | Naka | 74/540 X |
| 4,102,218 | 7/1978 | Naka et al. | 74/540 X |
| 4,217,792 | 8/1980 | Kesling | 280/775 X |
| 4,430,905 | 2/1984 | Bruguera | 74/443 |
| 4,449,420 | 5/1984 | Baba | 114/144 R X |
| 4,467,667 | 8/1984 | Baba | 74/493 |
| 4,530,254 | 7/1985 | Toyoda et al. | 74/540 X |
| 4,538,477 | 9/1985 | Kurusu et al. | 74/540 X |
| 4,538,478 | 9/1985 | Sato et al. | 74/540 X |
| 4,543,848 | 10/1985 | Beauch | 280/775 X |
| 4,726,311 | 2/1988 | Niina | 114/144 R |
| 4,793,204 | 12/1988 | Kubasiak | 280/775 X |
| 4,834,658 | 5/1989 | Kotani et al. | 464/151 X |
| 4,850,239 | 7/1989 | Oosterwal | 74/493 |

Primary Examiner—Allan D. Herrmann
Assistant Examiner—Julie Krolikowski
Attorney, Agent, or Firm—Hopgood, Calimafde, Kalil, Blaustein & Judlowe

[57] ABSTRACT

A tiltable marine steering helm assembly which includes a steering-wheel shaft mounted in a universal joint permitting the steering wheel shaft to be tilted at various angles and providing the full rotational movement of the wheel regardless of the tilt angle. The universal joint includes two pairs of yokes mounted perpendicularly to each other, and a coupling operatively engaged by these yokes. The wheel shaft is able to tilt vertically and to rotate freely due to the design of the universal joint. The components of tilt helm assembly may be reconfigured to permit mounting on either a vertical or a 20 degree tilt dashboard. Also provided in a flexible helm cover which can be installed to the helm assembly without hardware.

24 Claims, 7 Drawing Sheets

TILTABLE MARINE STEERING HELM

BACKGROUND OF THE INVENTION

1. Field of Invention

The present invention relates generally to marine steering helms, and, more particularly, to a tiltable steering helm having a universal joint which allows the steering wheel to be tilted at a variety of angles while maintaining the ability to rotate freely and steer the vessel.

2. Brief Description of the Prior Art

In modern marine vessels, including for example, motor boats, it is common to provide a helm in which a dashboard-mounted steering wheel mechanism controls the boat rudder. The function of the steering mechanism is to translate rotational movement of the steering wheel into an angular deflection of the rudder thereby steering the boat Most prior art helms are built with the dashboard disposed either vertically or tilted 20 degrees from vertical. Although these helms are suitable for steering the vessel, the fixed steering wheel does not allow for adjustment to meet the needs of individual users. For example, a tall person may prefer the wheel to be tilted up higher than would a shorter person, but the standard fixed helm cannot be tilted and must remain at the angle set by the manufacturer.

Because it would be much more convenient to have an adjustable helm, several tiltable helms have been proposed. For instance, U.S. Pat. No. 2,826,090 issued to Grinnell, et al. discloses a steering mechanism in which the steering column may be pivoted around a pivot bolt to accommodate the operator. U.S. Pat. No. 2,926,545 issued to Loeffler discloses a different type of adjustable helm wherein the steering post may be adjusted either longitudinally or angularly by manipulating a segmental adjusting block and fasteners which lock the post in place.

Several types of vertical-mount adjustable helms are also known and available from Teleflex Marine, of Limerick, Pa. Such vertical-mount prior art helms permit steering wheel adjustment over a range of degrees.

While these prior art helms provide steering wheel tilt capabilities, they nevertheless suffer from significant shortcomings and drawbacks. For example, different steering mechanisms are required for vertically mounted and tilt-mounted helms. Prior art helm adjustment may require the use of tools, and may be quite time consuming. Also, in many prior art helm designs, efficient and durable linkage between the wheel and the rudder is sacrificed for the sake of adjustability. These and other disadvantages of prior art adjustable helms, suggest the need for a more versatile and practical design.

Accordingly, it is a primary object of the present invention to provide an improved tiltable helm for marine vessels.

An additional object of the present invention is to provide a tiltable helm in which the rotational movement of the wheel position is independent of the angle of the wheel shaft.

It is a further object of the present invention to provide an adjustable helm having a single mounting mechanism that permits mounting of the helm either on a vertically or 20 degree tilted dashboard.

It is another object of the present invention to provide a helm which operates efficiently and may be used on most modern marine vessels.

Yet another object of the present invention is to provide a tiltable helm utilizing a universal joint having a five-piece yoke which provides a reliable linkage between the steering wheel and boat rudder while allowing steering wheel adjustability.

An even further object of the present invention is to provide an accordion-type tilt helm cover which is flexible and attachable to the tilt helm assembly without the use of hardware.

These and other objects of the present invention will become apparent hereinafter.

SUMMARY OF INVENTION

One aspect of the present invention concerns a tiltable marine steering helm comprising a wheel shaft connected to a universal joint that allows the wheel shaft to be tilted at various angles and provides for full rotational movement of the wheel regardless of the tilt angle. The universal joint includes two pairs of adjoined yoke halves that are mounted perpendicularly to each other by way of a coupling embraced by these yokes.

Another aspect of the present invention also concerns a mounting mechanism which permits mounting of the helm on either a vertical or a 20 degree tilt dashboard. In particular, the helm base is designed to be utilized as a common part for both mounting configurations.

Yet another aspect of the present invention concerns an adjustable helm assembly provided with an accordion-type tilt helm cover that requires no mounting hardware and yet protects helm components from the natural elements.

BRIEF DESCRIPTION OF THE DRAWINGS

For a fuller understanding of the objects of the present invention, reference is now made to the following detailed description of the preferred embodiment in connection with the accompanying drawings, wherein.

DETAILED DESCRIPTION OF THE PREFERRED EMBODIMENTS

Figure 1:
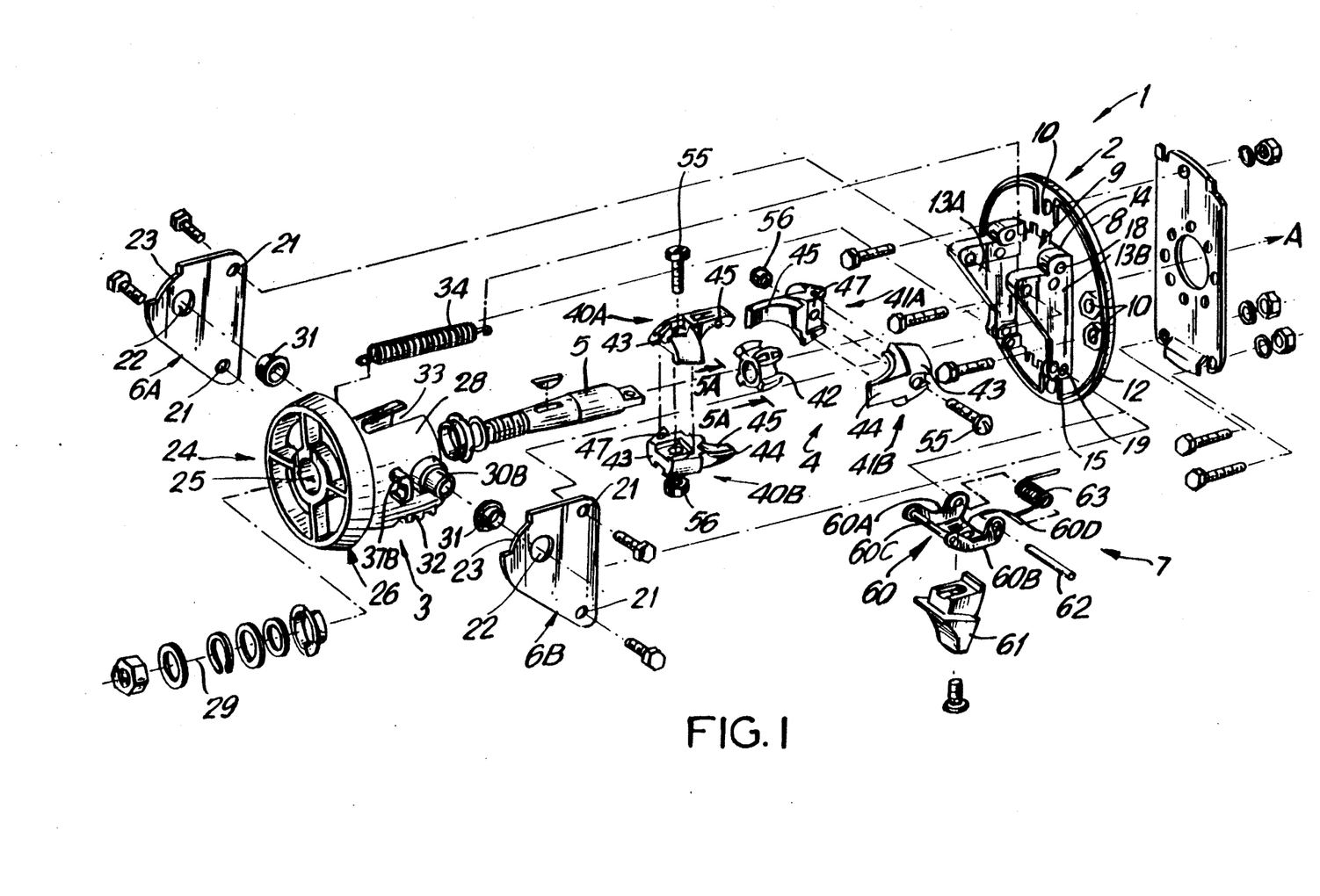
FIG. 1 is an exploded view of the tilt helm assembly of the present invention adapted for either vertical or 20 tilt mounting to the front of a boat dashboard.
Figure 2:
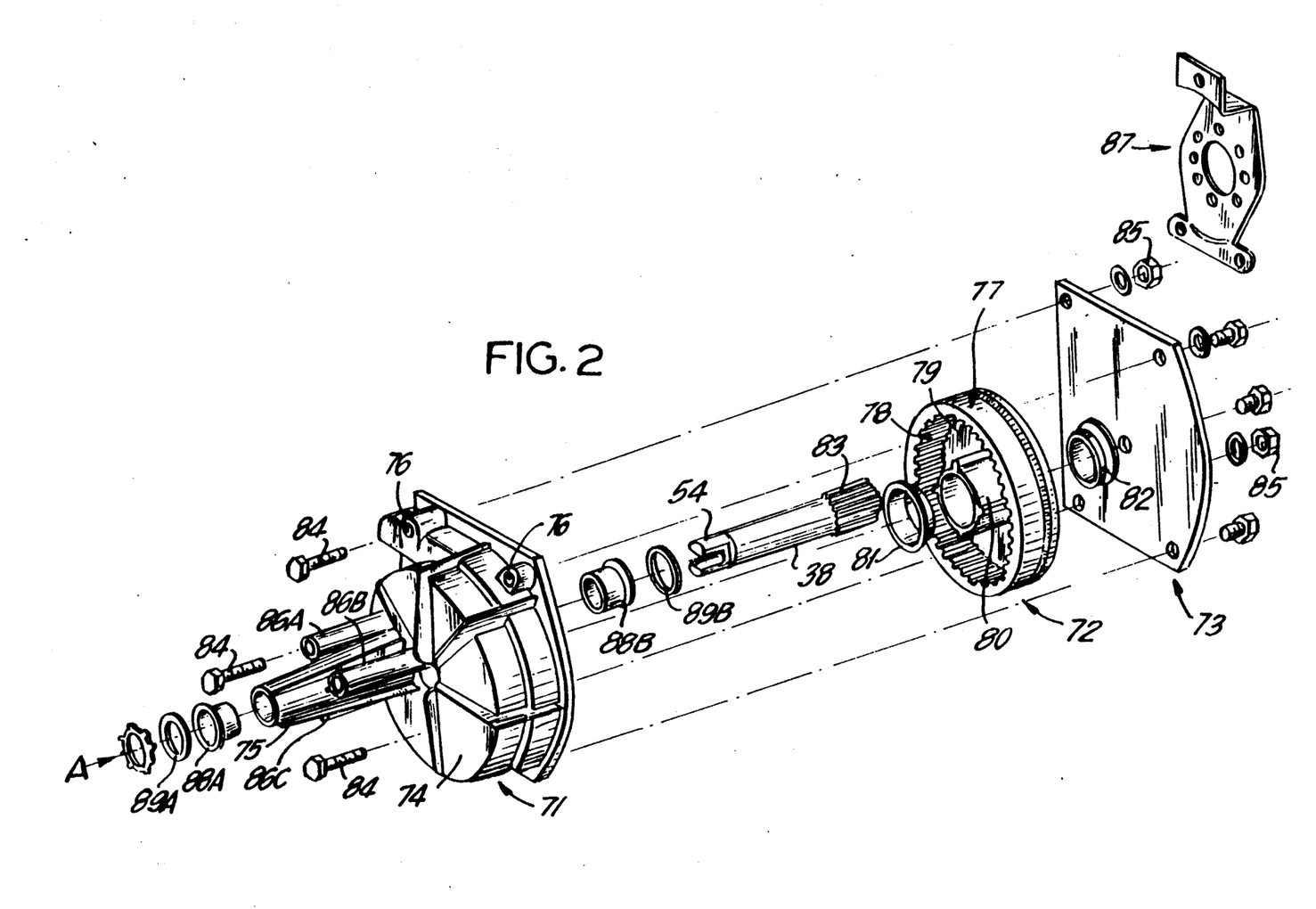
FIG. 2 is an exploded view of the helm drive assembly of the present invention, adapted for installation behind and in operable association with the tilt helm assembly through the boat dashboard as shown along line A—A in FIGS. 1 and 2.

In FIGS. 1 and 2, the components of the tilt helm assembly 1 and helm drive assembly 70 of the present invention, are shown in exploded view. Tilt helm and drive assemblies fully assembled, are shown in FIGS. 3, 3A and 4, 4A respectfully, in two different mounting configurations.

As illustrated in FIG. 1, tilt helm assembly 1 generally comprises helm base 2, steering-wheel shaft support frame 3, universal joint subassembly 4, steering wheel shaft 5, support frame mounting plates 6A and 6B, and steering-wheel shaft position locking mechanism generally indicated by reference numeral 7.

Helm base 2 comprises base plate 8 having a centrally disposed port 9 and a plurality of mounting holes 10 disposed about its circumference. Base plate 8 is adapted for mounting to the dashboard 11 of a maritime vessel as illustrated in FIGS. 3, 3A and 4 and 4A. Base plate 8 also includes a continuous flange 12 circumferentially disposed about the perimeter of base plate 8. Helm base 2 also includes a pair of spaced-apart parallelly disposed helm brackets 13A, 13B which orthogonally project from base plate 8, proximate port 9 as shown in FIG. 1. Each helm bracket 13A, 13B has a first end 14 and a second end 15, and bears a first and second set 16, 17 of helm base mounting holes, respectively.

Figure 3:
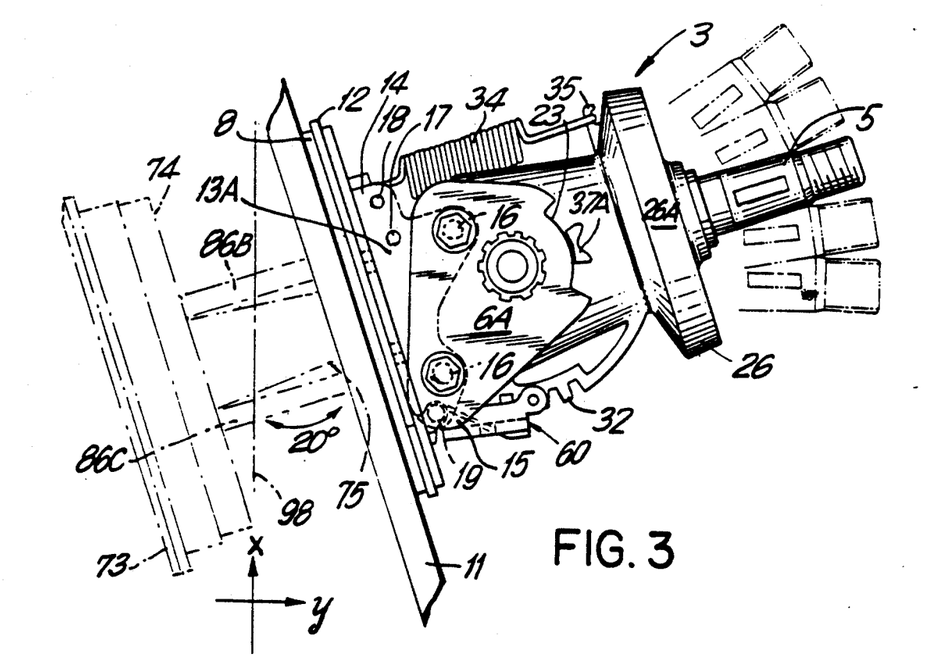
FIG. 3 is a side elevational view of the tilt helm assembly of the present invention shown configured and mounted on a dashboard positioned 20 degrees from vertical, and without the tilt helm cover.
Figure 4:
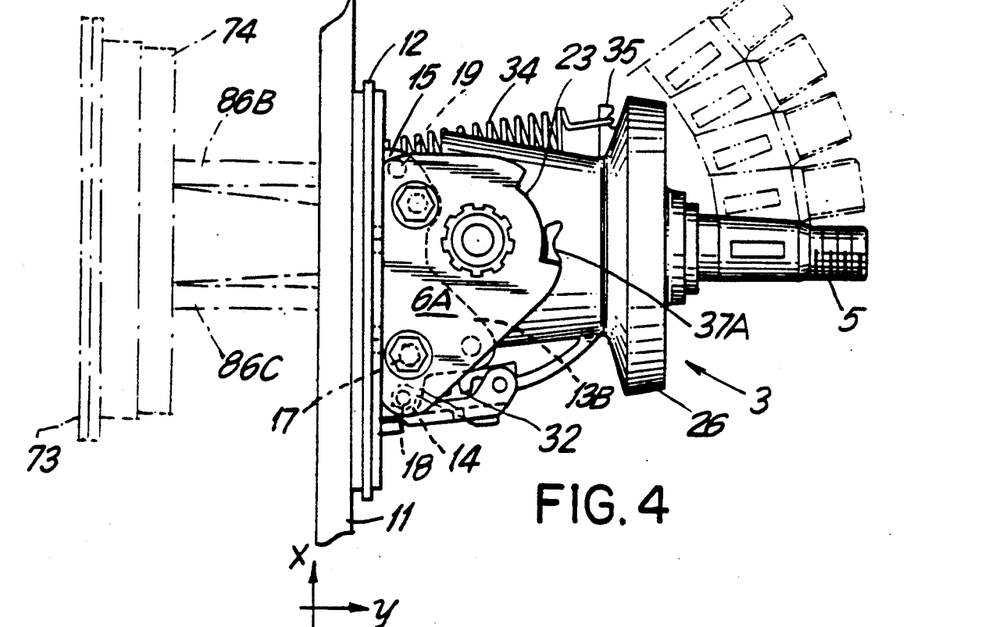
FIG. 4 is a side elevational view of the tilt helm assembly shown reconfigured and mounted on a vertically disposed dashboard, without the tilt helm cover.

As illustrated in FIGS. 1, 3 and 4, first and second ends 14 and 15 of the helm brackets 13A, 13B are provided with a first pair and a second pair of bores, 18 and 19 respectively. The function of these pairs of bores 18 and 19 will described in detail hereinafter.

Figure 3A:
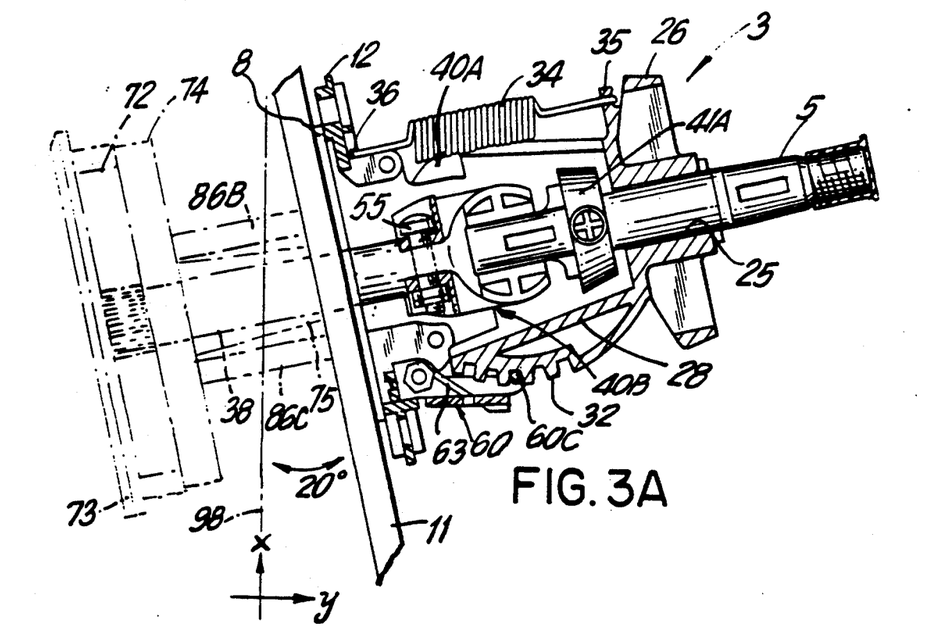
FIG. 3A is a sectional view of the tilt helm assembly of FIG. 3.
Figure 7A:
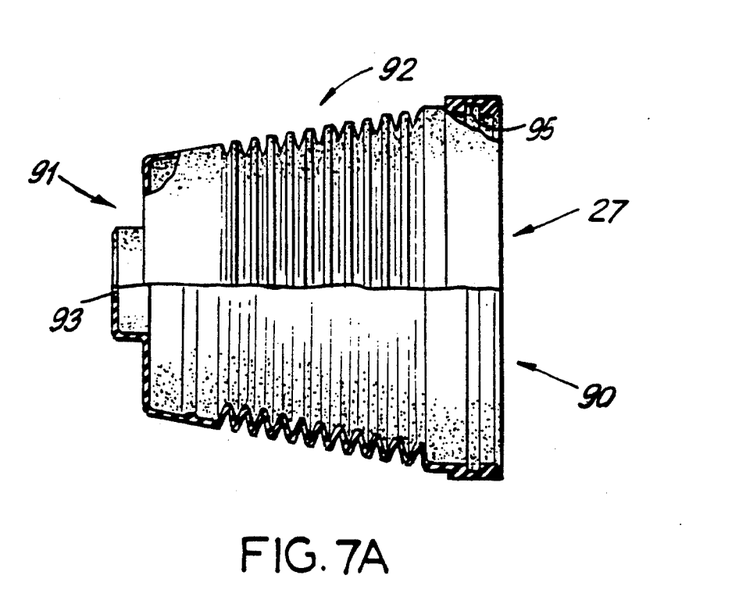
FIG. 7A is an elevated side view of the tilt helm cover of the present invention which is adapted for enclosing the components of the tilt helm components from natural elements.
Figure 7B:
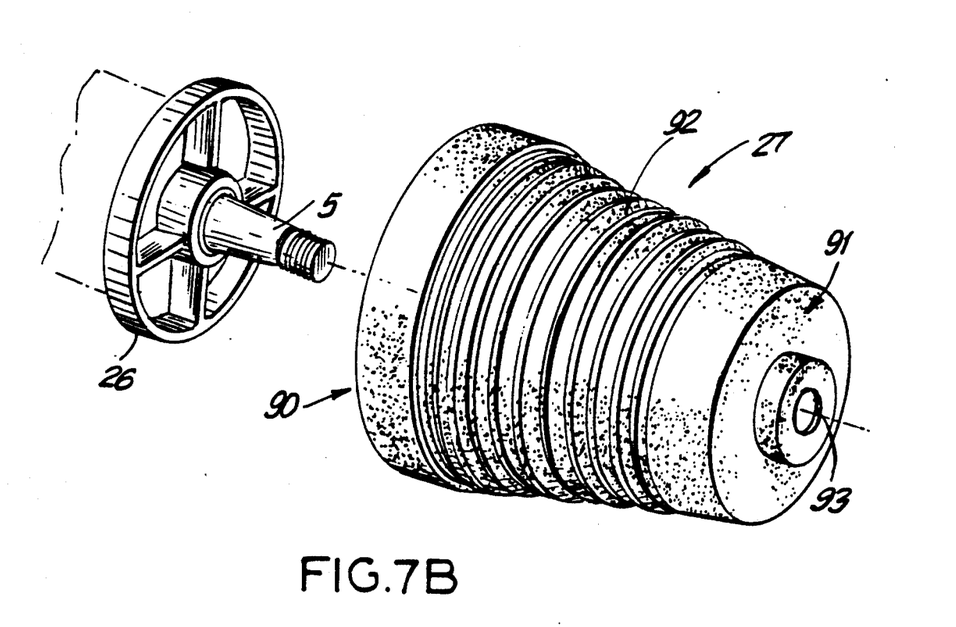
FIG. 7B is a perspective view showing the shaft cover of FIG. 7A being installed onto the tilt helm assembly.

Support frame mounting plates 6A and 6B are provided for pivotally mounting support frame 3 relative to helm base 2. As illustrated, each support frame mounting plate 6A, 6B bears a pair of mounting plate holes 21, which are adapted to coincide with either of the first and second sets of helm base mounting holes 16 and 17, as illustrated in FIGS. 3A, 4B, and 7D. Additionally, each support frame mounting plate 6A and 6B has a bore 22 for pivotally mounting support frame 3. A tilt delimiting channel 23 is also formed in each mounting plate 6A, 6B for restricting the range of tilt of support frame 3 relative to helm base 2, in a manner to be described in detail hereinafter.

As illustrated in FIGS. 1 and 7D, support frame 3 comprises an annular portion 24 having a port 25 for passage and support of steering-wheel shaft 5. Annular portion 24 is provided with a support flange 26 which is circumferentially disposed and lies generally within the same range of planes as port 25. As shown, support flange 26 has a smooth support surface 26A that provides support to flexible helm assembly cover 27 when fitted over tilt helm assembly, in a manner to be described hereinafter.

Support frame 3 also includes a generally cylindrical frame portion 28 which extends substantially orthogonally from annular portion 24 and is coaxially aligned with steering wheel shaft axis 29 that passes through port 25, as illustrated in FIG. 1. Support frame 3 has a pair of posts 30A and 30B projecting from opposite sides of cylindrical frame portion 28. The end of each post 30A, 30B is provided with a bushing 31, that is fitted inside a respective bore 22 of support frame mounting plate 6A, 6B. The underside of annular portion 28 is provided with a set of teeth 32, whereas the upperside of cylindrical frame portion 28 is provided with a cut-out portion 33. As illustrated in FIGS. 3, 3A, 4 and 4A, cut-out portion 33 is provided to facilate passage of helm tilt-biasing spring 34 which is connected at one end to cylindrical frame portion 28 at 35, and at its other end to helm base 2 at 36. In addition, a pair of tilt-delimiting pins 37A, 37B project from opposite sides of cylindrical frame portion 28, adjacent support posts 30A and 30B. Tilt-delimiting pins 37A, 37B are adapted to move within respective tilt delimiting channels 23 formed in mounting plates 6A and 6B, that is, over a range of tilt-positions determined by these channels 23.

Figure 6A:
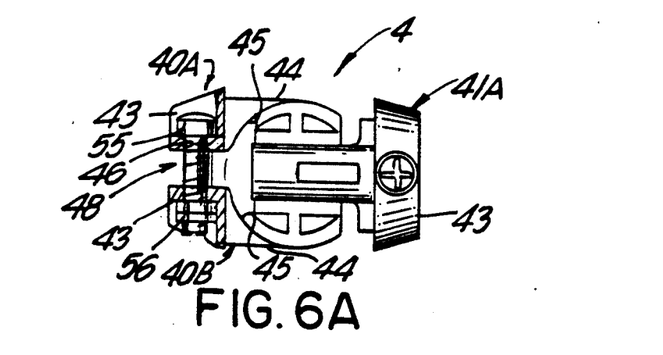
FIG. 6A is a side elevational view of the yoke halves of the tilt helm assembly in operable association with the coupling, shown with the steering wheel shaft of the tilt helm assembly and the drive shaft of the helm drive assembly, each being disattached from respective yoke halves.
Figure 6B:
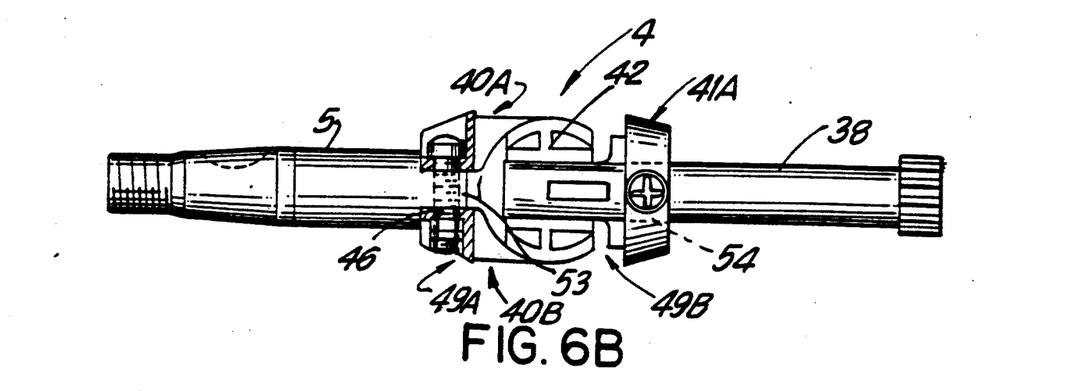
FIG. 6B is a side elevational view of the yoke halves, coupling, steering wheel shaft and drive shaft in operable association.

As illustrated in FIGS. 3, 3A and 4, 4A, steering wheel shaft 5 and drive shaft 38 of the helm drive assembly are operably associated or linked in such a way that permits transfer of torque from steering wheel shaft 5 to drive shaft 38 while support frame 3 is locked into each tilt position permitted over the tilt range. In accordance with the present invention, steering wheel shaft 5 and drive shaft 38 are operably associated by universal joint subassembly 4 which comprises a first and a second pair of yoke halves 40A, 40B and 41A, 41B and a coupling 42. As shown in FIGS. 1, 6A and 6B, each yoke half comprises a body portion 43 from which extends a half of a C-shaped projection 44, which has a smooth inner bearing surface 45. Body portion 43 of each yoke half has a bore 46 formed therethrough, and an adjoining surface 47 which is adapted to brought into contact with the adjoining surface 47 of its mating yoke half. In such body portion 43 a groove 48 is provided for insertion of the end portion of steering wheel shaft 5 or drive shaft 38.

In FIGS. 6A and 6B, first and second pairs of joined yoke halves 40A, 40B and 41A, 41B, form first and second C-shaped members 49A and 49B respectively, which engage the coupling 42 in a manner described below.

Figure 5A:
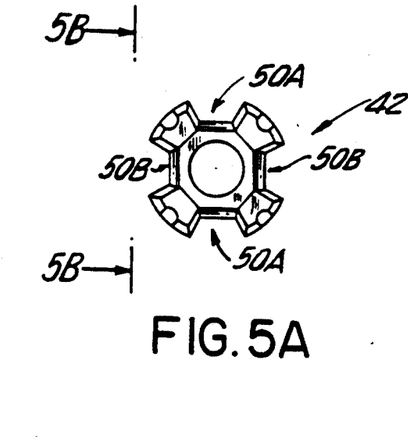
FIG. 5A is a side elevational view of a coupling of the present invention, taken along line 5A—5A of FIG. 1.
Figure 5B:
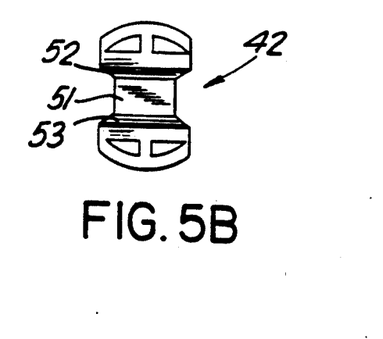
FIG. 5B is a side elevational view of the coupling of FIG. 5A taken along line 5B—5B of FIG. 5A.

As illustrated in FIGS. 5A and 5B, coupling 42 has first and second pairs of opposing surface channels 50A and 50B. Notably, the first pair 50A is orthogonally disposed with respect to the second pair 50B. Each pair of surface channels is defined by side walls 51, 52, and 53, and are adapted to be engaged with inner bearing surfaces 45 of each respective yoke half, as illustrated in FIGS. 6A and 6B, in particular. As shown, first pair of surface channels 50A are operably associated with first C-shaped engaging member 49A. Similarly, second pair of surface channels 50B are operably associated with second C-shaped engaging member 49B.

With end portions 53 and 54 each clamped between a pair of yoke halves, as shown in FIG. 6B, a bolt 55 can be passed through bore 46, and secured with a nut 56 to connect steering wheel shaft 5 and drive shaft 38 to pairs of yoke halves 40A, 40B and 41A, 41B, respectively. With coupling 42 embraced by pairs of adjoined yokes via engaging inner bearing surfaces 45 and surface channels 50A, 50B, first and second pairs of adjoined yokes 40A, 40B and 41A, 41B are free to rotate (i) partially in a first plane, (ii) fully in a second plane (orthogonal to the first plane), and (iii) independent of the rotational position of coupling 42 with respect to the first plane. With universal joint subassembly 4 of the present invention, steering wheel shaft 5 can be tilted in a first plane which is locked into position, and then rotated freely in the second plane independent of the angle of tilt of the steering wheel shaft in the first plane.

Figure 4A:
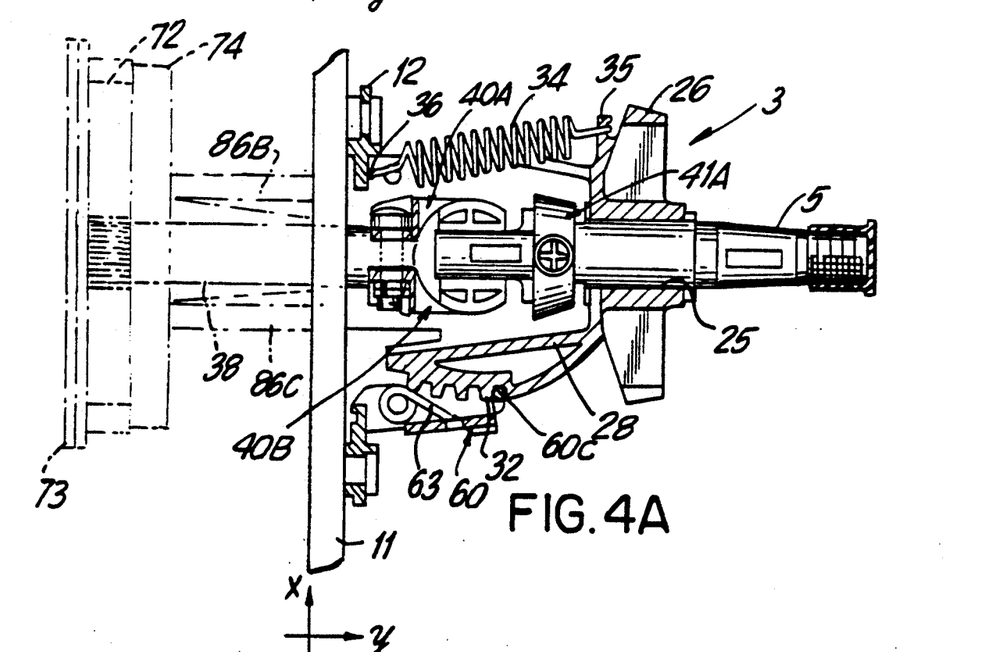
FIG. 4A is a sectional view of the tilt helm assembly of FIG. 4.

In order to selectively lock pivotally supported support frame 3 into one of the range of tiltable positions, the tilt helm assembly further includes releasable locking mechanism 7. Releasable locking mechanism 7 comprises an extension member 60, a lever 61, axle 62, and biasing spring 63. Extension member 60 includes a pair of spaced-apart side arms 60A and 60B which are joined by transverse bar 60D, as illustrated in FIG. 1. As shown, an extension bar 60C is supported at the ends of side arms 60A and 60B, through a pair of bores formed therein. The other ends of arms 60A and 60B are pivotally connected to helm base 2, by passage of axle 62 through bores formed in the arms, and bores 18 (19) formed in helm brackets 13A and 13B. As illustrated in FIGS. 1, 3A and 4A, lever 61 is attached to transverse bar 60D, and spring 63 is disposed between arms 60A and 60B with axle 62 passing therethrough. This structural arrangement ensures that extension bar 60C is biased towards a locking position defined between a pair of adjacent teeth 32. By depressing lever 61 downwardly, extension bar 60C is disengaged from the set of teeth 32 on support frame 3; thereafter, the tilt angle of the support frame 3 relative to helm base 2, can be repositioned. By releasing lever 61, extension bar 60C engages in a new set of teeth to maintain a newly selected tilt position.

As illustrated in FIG. 2, helm drive unit 70 comprises drive shaft 38, housing 71, cable take-up/supply wheel 72 and cover plate 73. Housing 71 generally includes a housing portion 74 having a geometry sufficient to enclose cable take-up/supply wheel 72 when helm drive unit 70 is assembled. Housing portion 74 has a centrally disposed stem portion 75 which extends outwardly from the front portion thereof and is fitted with lining bearings 88A, 88B, and washers 89A, 89B, as shown in FIG. 2. The rear portion of housing, on the other hand, is open so that cable take-up/supply wheel 72 can be installed within housing portion 74. Housing portion 74 also has a pair of cable outlet ports 76 for feeding out and reeling in cable as required.

As illustrated in FIG. 2, the outer portion of cable take-up/supply wheel 72 comprises a cable storage rim 77 having a channel depth sufficient to store a supply of cable (not shown). In a conventional manner, such cable is operatively connected to a boat motor or rudder (not shown). The inner surface of cable take-up/ supply wheel 72 is provided with gear teeth 78. One side of cable take-up/supply rim 72 is provided with a circular mounting plate 79, having a centrally disposed mounting shaft 80, fitted with bearing lining 81. Cover plate 73 is provided with a raised bearing projection 82 over which shaft 80 mounts so that cable take-up/supply reel 72 is free to rotate thereupon. Drive shaft 38 is provided with a pinion gear 83 that meshes with gear teeth 78 when (i) drive shaft 38 is installed through housing shaft 75, (ii) cable take-up/supply wheel 72 is installed in housing portion 74 and (iii) cover plate 73 is fastened to rear of housing 71 by a set of screws 84 and nuts 85. In order to mount helm drive assembly 70 to the rear of dashboard 11, housing portion 74 is provided with a triad of mounting sanctions 86A, 86B, and 86C which extend parallel along the direction of shaft housing 75 and are connectable to dashboard mounting bracket 87 which is fastenable to the rear of dashboard using wood screws.

Figure 7C:
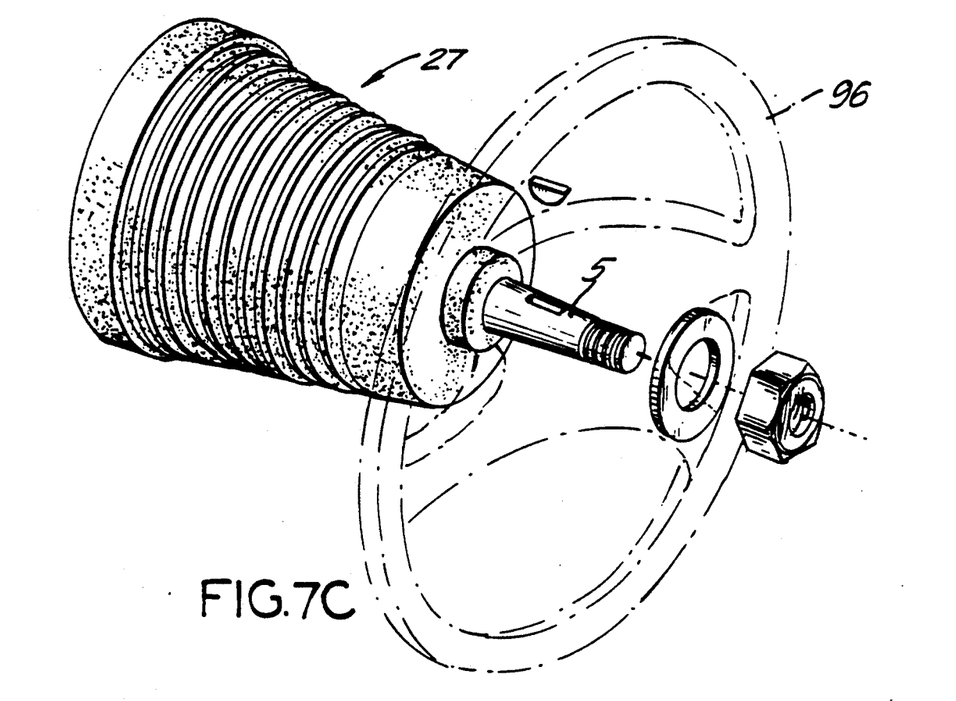
FIG. 7C is a perspective view of the tilt helm cover installed over tilt helm assembly, with the steering wheel in place.
Figure 7D:
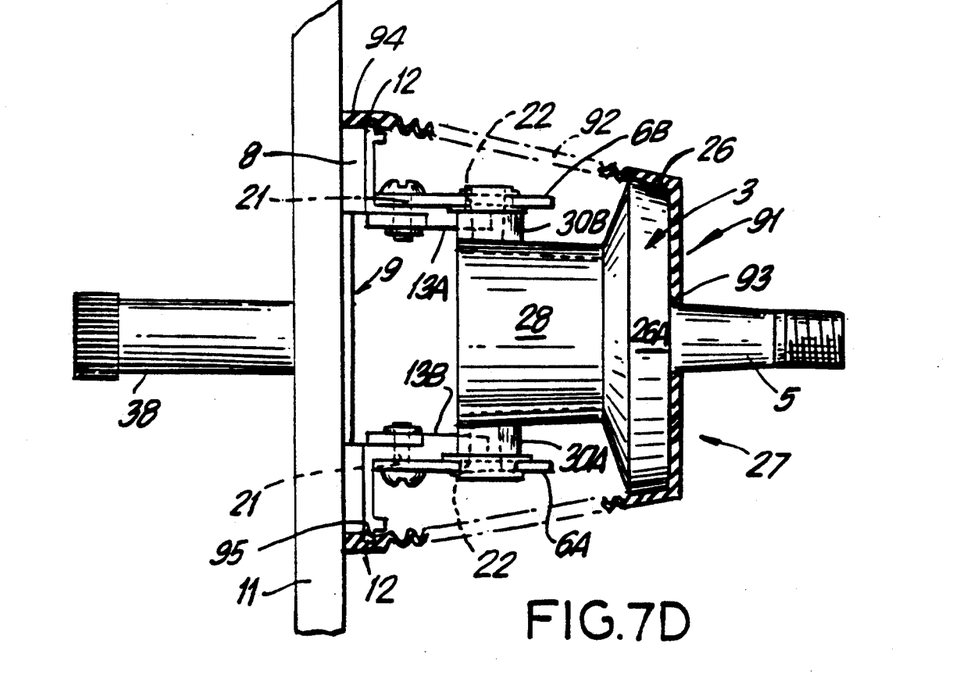
FIG. 7D is a plan view of the tilt helm assembly of the present invention, showing a cross-section of the tilt helm cover installed on the tilt helm assembly.

In order to protect universal joint subassembly 4, shafts 5 and 38, and support frame 3 from contact with foreign objects, such as dirt, salt water, etc., a flexible tilt-helm cover (i.e., boot) 27 is installed between helm base flange 12 and support frame flange 26, as shown in FIGS. 7C and 7D. Flexible helm cover 27 illustrated in FIGS. 7A through 7D is generally of conical geometry, defined between a generally open first end portion 90 and a generally closed off second end portion 91. Flexible helm cover 27 has a flexible continuous accordion-type surface 92 extending between first and second end portion 90 and 91, as shown in FIGS. 7A through 7C. Second end portion 91 has an opening 93 on order of the diameter of shaft 5, and is formed so as to snap over support flange 26. First end portion 90 has a rim 94 which has a continuous internal groove 95 which is adapted to snap-fit over continuous flange 12 on helm base 8. No external hardware is required to maintain helm cover 27 installed over tilt helm assembly of the present invention. After installation of flexible helm cover 27 over tilt helm assembly 1, steering wheel 96 can be installed upon shaft 5 in a manner known in the art.

As illustrated in FIGS. 7A through 7D, flexible helm cover 27 has accordion-like folds so that it may easily adjust to the tilting of shaft support 3. Helm cover 27 also has an aperture 95 formed in surface 92 to permit lever 61 to snugly protrude through helm cover 27 and enable operation of releasable locking mechanism 7. Any suitable flexible material may be used for helm cover 27, although attention should be paid to the need for long-term durability and resistance to the corrosive effects of salt water and ultra-violet exposure. Furthermore, the material should have sufficient structural integrity so that it will not fall into the mechanism and interface with the operation of the tilt helm.

As illustrated in FIGS. 3, 3A and 4, 4A, tilt helm assembly 1 can be mounted to both vertically disposed as well as inclined (i.e., slanted) dashboards, while providing substantially the same range of tilt positions with respect to vertical reference axis 98. This versatile mounting capability is achievable by simply reconfiguring helm base plate 8 and support frame mounting plates 6A, 6B, as shown in FIGS. 3 and 4, for inclined and vertical mounting positions, respectively.

In the preferred embodiment, each helm bracket 13A and 13B is capable of being connected to one of support frame mounting brackets 6A and 6B in either a first mounting configuration or a second mounting configuration.

For example, in the first mounting configuration, shown in FIGS. 3 and 3A, helm base 2 is mounted to dashboard 11 inclined at 20°, and helm brackets 13A, 13B are connected to support frame mounting brackets 6A, 6B respectively, with mounting plate holes 21 coinciding with first pair of helm base mounting holes 16. In this configuration, first end 14 of helm brackets are directed upwardly, and support frame 3 (and thus shaft 5) can be adjustably positioned into one of the range of 5 tilt positions, indicated in FIG. 3.

In the second mounting configuration shown in FIGS. 4 and 4A, helm base 2 is mounted to a vertically disposed dashboard 11 and helm brackets 13A, 13B are connected to support frame mounting brackets 6A, 6B respectively, with mounting plate holes 21 coinciding with second pair of helm base mounting holes 17. Notably in this second mounting configuration, helm base plate 8 is rotated 180° so that the second ends 15 of helm brackets 13A, 13B are directed upwardly rather than downwardly, as in the first mounting configuration. In either second mounting configurations of the illustrated embodiment, steering-wheel shaft 5 can be adjustably positioned into one of the tilt positions ranging between about 20 to about 60 degrees. It is understood that this tilt range can be larger or smaller in any particular embodiment of the present invention.

While the particular embodiments shown and described above have proven to be useful in many applications in the maritime helm art, modifications and variations of the present invention herein disclosed will occur to persons skilled in the art. The present invention is not intended to be limited to the embodiments illustrated and described, but encompasses all embodiments within the scope and spirit of the appended claims.

What is claimed is:

1. A tiltable marine steering helm comprising:
    a universal joint assembly including first and second pairs of yokes perpendicularly mounted with respect to each other, and a coupling seated within said pairs of yokes and being at least partially rotatable in a first vertical plane and fully rotatable in a second vertical plane independent of the rotational position of said coupling in said first vertical plane, said first and second vertical planes being perpendicular;
    a steering wheel shaft, one end of which is operably associated with said first pair of yokes, and said coupling allowing said steering wheel shaft to be tilted in said first vertical plane and to rotate freely in said second vertical plane independent of the angle of tilt of said steering wheel shaft in said first vertical plane;
    a support frame having a port for passage and support of said steering wheel shaft;
    a helm base for pivotally support said support frame and having a flange for attachment of a helm cover;
    a pair of side plates mounted on opposite sides of said universal joint assembly, said plates being mounted approximately parallel to said first vertical plane;
    locking means for releasably locking said steering wheel shaft at a selected tilt angle; and
    a flexible helm cover attachable at one end thereof to said flange, and at the opposite end thereof about said steering wheel shaft.

2. The tiltable helm of claim 1, wherein said helm base is adapted to be mounted upon a dashboard that is either vertical or slanted 20 degrees from vertical.

3. The tiltable helm of claim 1, wherein said wheel shaft can tilt within a range of positions from approximately horizontal to approximately 40 degrees above the horizontal.

4. A tiltable marine steering helm capable of mounting to the front face of a vertically disposed or inclined dashboard of a marine vessel, said tiltable marine helm comprising:
    a support frame having a port for passage and support of a steering wheel shaft;
    a pair of support frame mounting plates for pivotally mounting said support frame; and
    a helm base adapted for mounting to the dashboard of said marine vessel, said helm base having a pair of spaced-apart parallelly disposed helm brackets, each said helm bracket capable of being connected to one of said support frame mounting plates so that said pair of helm brackets are connectable to said support frame mounting plates in either a first mounting configuration or a second mounting configuration,
    wherein said support frame can be selectively pivotally supported in one of a range of tiltable positions when said helm base is mounted to an inclined dashboard and said helm brackets and said support frame mounting plates are connected in said first mounting configuration, and
    wherein said support frame can be selectively pivotally supported in one of said range of tiltable positions when said helm base is mounted to a vertically disposed dashboard and said helm brackets and said support frame mounting plates are connected in said second mounting configuration.

5. The tiltable marine steering helm of claim 4, which further includes locking means for releasably locking said support frame into one of said range of tiltable positions.

6. The tiltable marine steering helm of claim 5, wherein said releasable locking means comprises
    an extension pivotally mounted to said helm brackets and biased towards a locking position,
    a lever operably associated with said extension, and
    a set of teeth provided to said support frame for engagement with said extension so as to maintain said support frame in one of said range of tiltable positions when said extension is engaged with one or more of said teeth.

7. The tiltable marine steering helm of claim 6, wherein each said helm bracket projects orthogonally from said helm base and bears at least a first set of helm base mounting holes and a second set of helm base mounting holes, and wherein each said support frame mounting plate bears a pair of mounting plate holes which are adapted to coincide with either one of said first and second sets of helm base mounting holes.

8. The tiltable marine steering helm of claim 7, wherein each said pair of helm brackets have a first end and a second end;
    wherein when said helm brackets and said support frame mounting plates are connected in said first mounting configuration, each said pair of mounting plate holes coincides with the said first set of helm base mounting holes and said first ends of said helm brackets are disposed upwardly; and
    wherein when said helm brackets and said support frame mounting plates are connected in said second mounting configuration, each said pair of mounting plate holes coincides with said second set of helm base mounting holes and said second ends of said helm brackets are disposed downwardly.

9. The tiltable maine steering helm of claim 8, wherein said first and second ends of said helm brackets have a first pair and a second pair of bores, respectively, for pivotally mounting said extension, said extension being pivotally mounted by way of said first pair of bores when said helm brackets and said support frame mounting plates are connected in said first configuration, and said extension being pivotally mounted by way of said second pair of bores when said helm brackets and said support frame mounting plates are connected in said second configuration.

10. The tiltable marine steering helm of claim 9, wherein said support frame is biased to move through said range of tiltable positions when said extension is selectively disengaged from said teeth upon depressing said lever.

11. The tiltable marine steering helm of claim 10, wherein said support frame has at least one tilt limiting projection which is permitted to move within a tilt delimiting channel formed in one of said support frame mounting plates.

12. The tiltable marine steering helm of claim 11, wherein said dashboard has a front side and a rear side, and said helm base has an aperture for passage of a drive shaft provided from a tilt helm drive assembly having a housing which is adapted for mounting on the rear side of said dashboard.

13. The tiltable marine steering helm of claim 12, wherein said steering wheel shaft and said drive shaft are operably associated by a universal joint comprising first and second pairs of yoke halves and a coupling.

14. The tiltable marine helm of claim 13, wherein said first pair of yoke halves are joined together so as to form a first C-shaped engaging member and said second pair of yoke halves are joined together so as to form a second C-shaped engaging member, said coupling having first and second pairs of opposing surface channels, said first pair of surface channels being operably associated with said first C-shaped engaging member and a second pair of opposing surface channels being orthogonally disposed with respect to said first pair of opposing surface channels and being operably associated with said second C-shaped engaging member.

15. The tiltable marine helm of claim 14, wherein said steering wheel shaft is operably associated with said first pair of yoke halves and said drive shaft is operably associated with said second pair of yoke halves.

16. The tiltable marine helm of claim 15, wherein said helm base includes a continuous flange circumferentially disposed about said helm base and said support frame includes a support flange circumferentially disposed about said port, and wherein a flexible helm cover is provided for encasing said support frame and said universal joint and has a first end portion and second end portion with a flexible continuous surface therebetween, said first end portion being adapted for releasable attachment about said continuous circumferential flange of said helm base and said second end portion being adapted to engage said support flange and encircle a portion of said steering-wheel shaft so as to prevent foreign objects from penetrating beyond said first or second end portions of said helm cover.

17. A tiltable marine steering helm comprising:
a universal joint assembly including a first yoke portion and a second yoke portion operably associated by a coupling;
a steering wheel shaft operably connected to said first yoke portion at one end of said steering wheel shaft;
a support frame having a first port of passage and support of said steering wheel shaft, and a support frame flange disposed about said first port;
a helm base adapted for mounting to a dashboard, and including support means for pivotally supporting said support frame over a range of tilt angles and a second port for passage of a drive shaft operably connectable at one end thereof to said second yoke portion, said helm base further including a helm base flange disposed about said helm base;
locking means operably associated with said support frame and said helm base, for releasably locking said steering wheel shaft at a selected tilt angle; and
a flexible helm cover for enclosing said support frame and said universal joint assembly, said flexible helm cover having a first end portion and a second end portion with flexible surface therebetween, said first end portion being generally open for passage of said support frame and said universal joint assembly and adapted for snap fit attachment about said helm base flange, and said second end portion having an opening for passage of said steering wheel shaft and being adapted to engage said support frame flange while permitting said steering wheel shaft to be releasably locked into a selected tilt angle within said range of tilt angles.

18. The tiltable marine steering helm of claim 17 wherein the flexible surface of said flexible helm cover comprises accordion type surface folds between said first and second end portions.

19. The tiltable marine steering helm of claim 17 wherein said first end portion includes a rim having a continuous internal groove adapted to snap over said helm base flange.

20. The tiltable marine steering helm of claim 19, wherein said support end portion is adapted to snap over said support frame flange.

21. A tiltable marine steering helm comprising:
a universal joint assembly including a first yoke portion and a second yoke portion operably associated by a coupling;
a steering wheel shaft operably connected to said first yoke portion at one end of said steering wheel shaft;
a support frame having first port for passage and support of said steering wheel shaft, and a support frame flange circumferentially disposed about said first port;
a helm base adapted for mounting to a dashboard, and including support means for pivotally supporting said support frame over a range of tilt angles, and a second port for passage of a drive shaft operably connectable at one end thereof to said second yoke portion, said helm base further including a helm base flange circumferentially disposed about said helm base;
locking means operably associated with said support frame and said helm base, for releasably locking said steering wheel shaft at a selected tilt angle; and
a flexible helm cover for enclosing said support frame and said universal joint assembly, said flexible helm cover having a first end portion and a second end portion being adapted for attachment about said helm base flange and said steering wheel shaft and being adapted to engage said shaft to be releasably locked into a selected tilt angle within said range of tilt angles.

22. The tiltable marine steering helm of claim 21, wherein the flexible surface of said flexible helm cover comprises accordion type surface folds between said first and second end portions.

23. The tiltable marine steering helm of claim 21, wherein said first end portion includes a rim having a continuous internal groove adapted to snap over said helm base flange.

24. The tiltable marine steering helm of claim 23, wherein said second end portion is adapted to snap over said support frame flange.

* * * * *

UNITED STATES PATENT AND TRADEMARK OFFICE
CERTIFICATE OF CORRECTION

PATENT NO. : 5,136,894
DATED : August 11, 1992
INVENTOR(S) : Thomas G. Carter et al.

It is certified that error appears in the above-identified patent and that said Letters Patent is hereby corrected as shown below:

In claim 21, line 26 (at column 10, line 64), between "portion" and "being" insert --with a flexible surface therebetween, said first end portion--;

line 27 (at column 10, line 65), before "steering wheel" insert --second end portion having an opening for passage of--; and line 28 (at column 10, line 66), before "shaft" insert --support frame flange while permitting said steering wheel--.

Signed and Sealed this

Third Day of February, 1998

BRUCE LEHMAN

Attest:

Attesting Officer

Commissioner of Patents and Trademarks

REEXAMINATION CERTIFICATE (3027th)

United States Patent [19]

Carter et al.

[11] B1 5,136,894

[45] Certificate Issued Oct. 15, 1996

[54] TILTABLE MARINE STEERING HELM

[75] Inventors: Thomas G. Carter, Kent; Roger R. Olsen, Stow, both of Ohio

[73] Assignee: Bankers Trust Company, New York, N.Y.

Reexamination Request:
No. 90/003,750, Mar. 15, 1995

Reexamination Certificate for:
Patent No.: 5,136,894
Issued: Aug. 11, 1992
Appl. No.: 576,062
Filed: Aug. 31, 1990

[51] Int. Cl.⁶ .................. B62D 1/18; G05G 5/06
[52] U.S. Cl. .................. 74/493; 74/540; 114/144 R
[58] Field of Search ............. 74/493, 540; 114/144 R;
464/151, 152, 155, 156; 180/258, 259; 280/775

[56] References Cited

U.S. PATENT DOCUMENTS

| | | | |
|---|---|---|---|
| 712,725 | 11/1902 | Rusby | 464/151 |
| 2,433,948 | 8/1943 | Good | 464/151 |
| 3,199,625 | 1/1964 | Liebreich | 74/493 X |
| 3,359,757 | 12/1967 | Adams | 464/175 X |
| 3,362,193 | 6/1966 | Ritsema | 464/175 X |
| 3,504,569 | 4/1970 | Zoltok | 74/493 |
| 4,157,019 | 6/1979 | von Allworden | 403/314 X |
| 4,887,481 | 12/1989 | Crack | 74/500.5 |
| 4,941,766 | 7/1990 | Carlson | 403/131 |

FOREIGN PATENT DOCUMENTS

| | | |
|---|---|---|
| 2530754 | 7/1982 | France. |
| 60-45469 | 11/1985 | Japan. |

OTHER PUBLICATIONS

TeleFlex Marine '88 Product Catalog, pp. 2–3, published in 1988 by TeleFlex Marine, Inc. of Limerick, Pennsylvania (4 sheets).

*Primary Examiner*—Allan D. Herrmann

[57] ABSTRACT

A tiltable marine steering helm assembly which includes a steering-wheel shaft mounted in a universal joint permitting the steering wheel shaft to be tilted at various angles and providing the full rotational movement of the wheel regardless of the tilt angle. The universal joint includes two pairs of yokes mounted perpendicularly to each other, and a coupling operatively engaged by these yokes. The wheel shaft is able to tilt vertically and to rotate freely due to the design of the universal joint. The components of tilt helm assembly may be reconfigured to permit mounting on either a vertical or a 20 degree tilt dashboard. Also provided in a flexible helm cover which can be installed to the helm assembly without hardware.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *